May 29, 1923.
N. I. DE BIE
POULTRY PLUCKING DEVICE
Filed Feb. 12, 1921
1,456,844
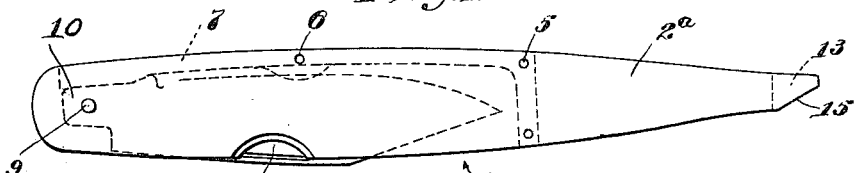
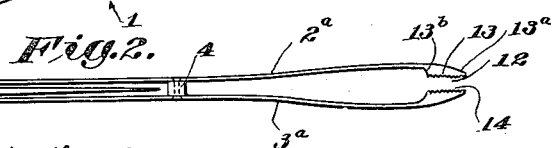
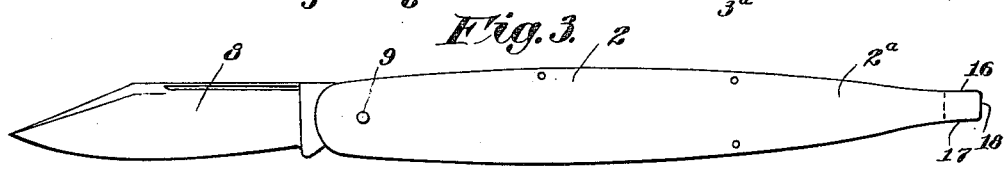
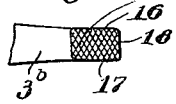
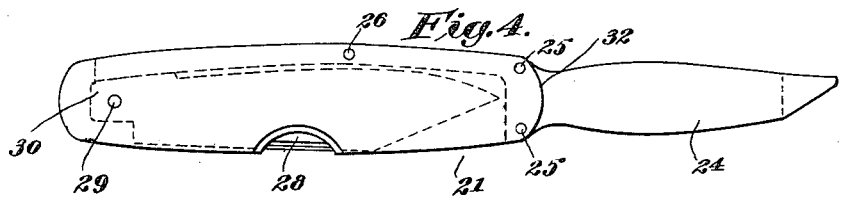
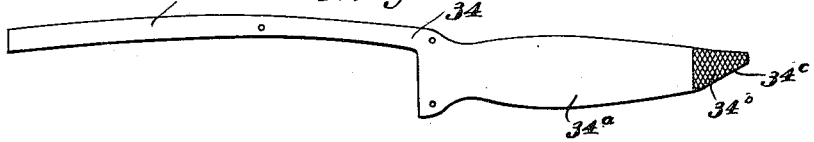
Inventor
Naomi Isnor De Bie
by Roberts, Roberts e Cushman
Attorneys Patented May 29, 1923.

1,456,844

UNITED STATES PATENT OFFICE.

NAOMI ISNOR DE BIE, OF WEST MEDFORD, MASSACHUSETTS.

POULTRY-PLUCKING DEVICE.

Application filed February 12, 1921. Serial No. 444,327.

*To all whom it may concern:*

Be it known that I, NAOMI ISNOR DE BIE, a citizen of the United States, and resident of West Medford, in the county of Middlesex and State of Massachusetts, have invented new and useful Improvements in Poultry-Plucking Devices, of which the following is a specification.

This invention relates to kitchen utensils and more particularly to a device for use in the dressing and cleaning of poultry.

In the plucking of poultry and particularly young fowl, or older fowl during the molting period, it is frequently found that the carcass is more or less clothed with immature feathers commonly known as "pin-feathers." These pin-feathers in their earlier stages of growth may protrude but a short distance from the surface of the skin and by reason of their peculiar consistency and deep root in the skin it is a matter of great difficulty to properly remove them. As the presence of the pin-feathers is objectionable from the culinary standpoint, much time is often consumed in properly preparing the fowl for cooking, and even when great care is used, it is frequently found that the attempted removal of the pin-feathers by means of the operator's thumb and finger results merely in breaking away the outer, protruding portion of the feather, leaving the end thereof in its socket in the skin where it shows as a dark spot or line, detracting from the appearance of the fowl as an article of food.

An object of the present invention is to provide an implement for removing the pin-feathers in a simple and expeditious manner and whereby a substantial portion of a pin-feather may be securely gripped adjacent its point of emergence from the skin, thus permitting its withdrawal with the minimum possibility of its breakage in the process.

As it is substantially necessary to employ a knife blade or equivalent instrument in the preparation of poultry for the table, it is convenient to combine the plucking device with a knife blade; and a further object of the invention is to provide an implement useful both for removing the pin-feathers and for incising the carcass.

For carrying into effect the above objects the plucking device may be arranged to comprise a pair of resilient members extending from one end of a knife handle and having their tips separated sufficiently to permit the grasping of a pin-feather therebetween, such members thus constituting pincers. The engaging surfaces of such resilient members may be substantially parallel for an appreciable distance when in gripping position and may be roughened if desired to permit them to secure a firm grip upon a considerable length of the feather. The knife employed may if desired be of that type in which the blade folds into the handle and the resilient gripping members may preferably be formed as integral extensions of parts comprised in the knife handle. Such members may for example extend from the side pieces which serve to protect the folded blade, or if desired may form extensions of the blade spring at the back of the handle.

While the ends of the grippers may be square, that is to say terminating in a line substantially at right angles to the longitudinal axis of the handle, in some cases it may be desirable to arrange such terminal line at an oblique angle to the axis of the tool in order to facilitate its manipulation in the hands of the user.

As one mode of attaining the desired objects the device illustrated in the accompanying drawings may be employed, and in which:—

Figure 1 illustrates one form of the implement in side elevation, the knife blade being in folded position;

Fig. 2 is an edge view of the device of Fig. 1 looking from the lower side thereof;

Fig. 3 is a side elevation of a slightly modified form of the device shown in Fig. 1 and illustrating the knife blade as in open or operative position;

Fig. 4 is a side elevation similar to Fig. 1 but illustrating a modified and preferred form of the device, Fig. 5 is an edge view similar to Fig. 2 but illustrating the device shown in Fig. 4, Fig. 6 is a side elevation of an element of the implement illustrated in Fig. 4 showing the same before assembled with the other parts; and Figs. 7, 8, and 9 are fragmentary views illustrating various shapes of the gripper element of the plucking device.

Referring to Fig. 1, the handle of the implement is indicated generally by the numeral 1. This handle comprises a pair of substantially flat members 2, 3 which may be of sheet metal or of any other suitable material such as is commonly employed in the making of knife handles or similar articles. These members are held in spaced relation by the spacer member 4 to which they are secured by the rivets 5, 6. The spacer element may have the knife spring 7 formed integrally therewith if desired, such spring serving to maintain the knife blade 8 in either closed or open position. The knife blade has the tang 10 which cooperates with the spring 7 and is pivotally secured between the members 2, 3 by means of the rivet 9.

In this form of the device the side members 2, 3 of the handle are extended at one end to form the resilient bladelike members 2$^a$ and 3$^a$ respectively. The blade members diverge at a point adjacent to the end of the handle, and then continue to their extremities in substantially parallel relation and in planes outside those of the sides of the handle, respectively. These members adjacent their free extremities are normally spaced apart as indicated at 12, and provided with opposed surfaces 13, 14, one or both of which is preferably roughened whereby to provide suitable gripping elements. These roughened surfaces extend from the extremities of the resilient blades, as for example from the point 13$^a$, to a point substantially removed from such extremity, as 13$^b$ whereby to provide a gripping surface of substantial extent. Preferably one edge at least of the gripping surfaces will be arranged at an oblique angle to the axis of the device as indicated at 15 of Fig. 1. This arrangement is to facilitate the use of the device as will be described hereinafter.

In the form shown in Fig. 3, the gripping surface, instead of being substantially triangular, as shown in Fig. 1, is of rectangular form having the sides 16, 17 and the square end 18. In Figs. 7, 8 and 9 are indicated various shapes of gripping surfaces which may be employed, that of Fig. 7 corresponding substantially to that shown in Fig. 3, wherein a blade as 3$^b$ terminates in the rectangular gripping surface 15' having the side edges 16, 17, 18. The form shown in Fig. 9 corresponds substantially to that shown in Fig. 1 wherein the blade 3$^c$ has the triangular gripping surface 14 provided with side edges 14$^a$, 14$^b$ and terminating at 14$^c$. In Fig. 8, the blade 3$^d$ terminates in a gripping surface 38 having oppositely inclined edges 38$^a$, 38$^b$ and 38$^c$.

In the form of device shown in Figs. 4, 5, and 6, the handle 21 may comprise the side members 22, 23 as in the device shown in Fig. 1, such members however, being spaced apart by a pair of like spacer members 24, 34, arranged in face to face relation between the members 22, 23. The spacer members and the handle members are secured together by rivets as 25, 26. The spacer members 24, 34 terminate in resilient members 27, which together comprise the knife spring. The knife blade 28 is pivoted at 29 between the side members of the handle and has a tang 30 for engagement with the spring members 27 whereby the knife blade is held in closed or open position as desired. As the spacer members 24, 34 are secured by the rivets 25, 26 to the handle members, it is clear that the members 27 must flex substantially about the rivet 26 as an axis and in the plane of the knife blade. In this form of the device the handle members 22, 23 terminate as indicated at 32, and the spacer members 24, 34 are extended beyond the end of the handle when they diverge to form the spaced transversely resilient members 24$^a$, 34$^a$. These members, after diverging to points beyond the planes of the respective side members 22, 23, continue in substantially parallel planes throughout the greater portion of their lengths, and are provided adjacent their free extremities with roughened gripping surfaces 24$^b$, 34$^b$ respectively, the members 24$^a$ and 34$^a$ flexing in a plane at right angles to the plane of flexure of the parts 27. These gripping surfaces are normally spaced apart as indicated at 32$^x$ and when closed together for gripping an object therebetween are caused to lie substantially parallel one to the other. These gripping surfaces may if desired, be of substantially triangular form as indicated at 34$^b$, Fig. 6, having at least one edge 34$^c$ substantially inclined to the longitudinal axis of the device.

With this arrangement of parts the members 24, 34 may be made of spring steel if desired, whereby at the same time to provide knife springs 27 and the resilient extensions 24$^a$, 34$^a$ having the gripping surfaces 24$^b$, 34$^b$. Such an arrangement is of substantial utility in so far as the economical manufacture of the implement is concerned, as it is thus possible to employ material of any desired character for the handle while at the same time to secure the desired resiliency in the extension members and knife springs whereby to permit them to operate for the purpose desired.

In the use of the device the operator grasping the handle will place his thumb and finger in contact with the outer surfaces of the blades 2$^a$, 3$^a$ or 24$^a$, 34$^a$ and by pressing the members together may cause the gripping surfaces to securely grip and hold a pin-feather of the fowl to be plucked. As the gripping surfaces are of substantial extent it is possible to obtain a secure hold upon a pin-feather whereby it may be removed with certainty. In this connection it is to be noted that pin-feathers, especially those which are not substantially developed, consist of a very thin and fragile tube enclosing a more or less fluid medium, and while readily broken, such pin-feathers are so deeply rooted in the skin as to require the exertion of considerable force to remove them. Any type of gripper device presenting sharp gripping edges is of little avail in the extraction of such pin-feathers, as it serves to break or crush the same before they can be removed. By the use of the present arrangement, however, a substantial length of the pin-feather is grasped whereby to distribute the pressure thereon and to permit the pulling of the same without breakage. The arrangement such as indicated in Fig. 9, for example, whereby one edge of the gripping surface lies at an angle to the axis of the implement enables the user to place such edge in contact with the skin of the fowl to be plucked while at the same time holding the handle in a convenient position for use without cramping the hand. While this latter form of gripping device is preferred, it is contemplated that various other forms, such for example as those shown in Figs. 7 and 8, may be found of use under certain circumstances.

It is of course to be understood that in cleaning and dressing a fowl the knife blade, which is normally folded in the handle, may be found of convenience for cutting the carcass or removing undesirable portions therefrom; and while this blade has been shown herein as foldable, it is contemplated that under some circumstances it might be made rigid with the handle and the entire device provided with suitable means for suspending the same upon a hook or other supporting means; or if desired the knife blade might be entirely dispensed with.

Having thus described the invention in a preferred embodiment of the same together with the mode of use thereof, what I claim and desire to secure by Letters Patent of the United States is:

1. A combined implement of the class described, having a handle comprising a pair of spaced side pieces, a pair of elongate spacer members arranged between the side pieces of the handle and extending beyond one end of the handle, and means for fixedly securing said members in assembled relation to the side pieces of the handle, the portions of said members which extend beyond the handle being resilient and constituting opposed tweezer blades.

2. In combination, a handle comprising spaced side pieces, a pair of elongate members interposed between said side pieces, rivets for securing said members and pieces in assembled relation, and integral extensions of said elongate members projecting from the end of the handle, said extensions being normally spaced apart and constituting a pair of tweezer blades.

3. A combination implement of the class described, comprising spaced side pieces, a pair of elongate members arranged in face-to-face relation and interposed between said side pieces for holding said side pieces in spaced relation whereby to provide a slot adapted for the reception of a foldable implement, and rivets extending through the side pieces and members for holding them in operative relation, said members having resilient elements extending beyond the ends of the side pieces and provided adjacent to their free extremities with opposed gripping surfaces whereby said elements are adapted to constitute a tweezer device.

4. A spring for use in the construction of compound tools of that type comprising a foldable knife blade and a tweezer device, said spring consisting of an elongate integral member having means adjacent to its central portion whereby it may be secured in assembled relation to other parts of the tool, and having one of its end portions constructed and arranged to flex in a given plane whereby to cooperate with the knife blade in retaining it in predetermined position, and having its opposite end portion constructed and arranged to flex in a plane at right angles to the plane of flexure of the first-named portion and provided with gripping means adjacent to its free extremity adapted to form one jaw of the tweezer device.

Signed by me at Boston, Massachusetts, this second day of February, 1921.

NAOMI ISNOR DE BIE.